(12) United States Patent
Rapeli

(10) Patent No.: US 6,510,313 B1
(45) Date of Patent: Jan. 21, 2003

(54) WIRELESS COMMUNICATION DEVICE

(75) Inventor: Juha Rapeli, Change (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/185,760

(22) Filed: Nov. 4, 1998

(30) Foreign Application Priority Data

Nov. 7, 1997 (EP) .............................. 97402682

(51) Int. Cl.[7] ................................. H04B 1/26
(52) U.S. Cl. ........................ 455/323; 341/122
(58) Field of Search ................ 455/323, 324, 455/313, 314, 226.4, 229, 315, 204, 310; 341/51, 122, 123; 375/316, 345, 347, 350; 370/210

(56) References Cited

U.S. PATENT DOCUMENTS

| | | | | |
|---|---|---|---|---|
| 3,806,804 A | * | 4/1974 | Mills et al. .................. | 455/509 |
| 4,359,608 A | * | 11/1982 | Watson et al. ............... | 704/205 |
| 4,755,795 A | * | 7/1988 | Page ........................... | 341/51 |
| 5,070,536 A | * | 12/1991 | Mahany et al. ............. | 455/67.4 |
| 5,251,218 A | * | 10/1993 | Stone et al. ................. | 370/343 |
| 5,323,391 A | * | 6/1994 | Harrison ..................... | 370/210 |
| 5,412,690 A | * | 5/1995 | Kotzin et al. ............... | 375/256 |
| 5,428,836 A | * | 6/1995 | Sanecki et al. ............. | 455/315 |
| 5,465,405 A | * | 11/1995 | Baseghi et al. .......... | 455/226.4 |
| 5,640,430 A | * | 6/1997 | Cudak et al. ............... | 375/343 |
| 5,848,108 A | * | 12/1998 | Tong et al. ................. | 375/350 |
| 6,009,130 A | * | 12/1999 | Lurey et al. ................. | 375/347 |

FOREIGN PATENT DOCUMENTS

WO    WO9102421    2/1991    ........... H04L/27/22

* cited by examiner

Primary Examiner—Dwayne Bost
Assistant Examiner—Joy K. Contee
(74) Attorney, Agent, or Firm—Michael Schmitt

(57) ABSTRACT

A low cost wireless multi-band communications device automatically adapts itself to a signal received from a particular system. On the basis of a bandwidth determination of the received signal, a sampling bandwidth and/or sampling time is selected and/or derived for down mixing the received signals. Improved noise immunity is provided via a band limiting of the sampling means. An adaptive filter is coupled to the output of the sampling means and is adjusted in to obtain a satisfactory level of adjacent channel interference rejection.

5 Claims, 2 Drawing Sheets

WIRELESS COMMUNICATION DEVICE

BACKGROUND OF THE INVENTION

The present invention relates to a wireless communication device as defined in the preamble of claim 1. Such a wireless communication system can be a cellular phone, a cordless phone, a laptop computer with a wireless communication part, or the like.

A communication device of the above kind is known from the PCT patent application WO 91/02421. In a WO 91/02421, a receiver is described for digitally modulated signals in mobile communication systems. After quadrature mixing down of received radio signals to a lower frequency band, the mixed down quadrature signals are sampled and, after analog-to-digital conversion, stored for processing. The modulation of the signals can be Gaussian Minimum Shift Keying such as used in a cellular GSM (Global System for Mobile Communications) system, or any other suitable type of modulation. Before the received signal is mixed down, a coarse filtering of the radio frequency signal at the antenna is done by a tuneable filter/amplifier with an adjustable amplification factor. The known communication device is a so-called direct conversion receiver or zero-IF (Intermediate Frequency) in which the lower frequency band signals after mixing down are baseband signals. In WO 91/02421 the baseband signals after mixing down comprise a desired signal, signals from neighbouring channels and superimposed noise. A pair of lowpass filters for respective filtering of the mixed down quadrature signals is provided for filtering out the desired signal. After low pass filtering the quadrature signals are sampled, digitised and processed. From a receiver design point of view, the described receiver structure is preferred over conventional superheterodyne receivers because a direct conversion receiver in principle can be fully integrated.

With the design of a direct conversion receiver, special attention should be given to phase accuracy of the quadrature signals, to leakage problems with the local oscillator, and to problems caused by offset. Such a wireless communication device is not suitable as a multi-band receiving device because it is designed for receiving a particular frequency band only. To this end, all frequency selectivity measures are directed to obtain a proper selectivity for this particular frequency band only.

At present, in various parts of the world, different types of mobile radio systems are installed or are being installed, such as GSM systems, CDMA (Code Division Multiple Access) systems, and, in the US, D-AMPS systems (Digital Advanced Mobile Phone System). Such systems are operating in different frequency bands and desired signals are transmitted in channels of different bandwidths. In GSM, a full-duplex TD/FDMA (Time Division/Frequency Division Multiple Access) system, the mobile equipment'receive band is 925–960 MHz, the transmit band is 880–915 MHz and the channel spacing is 200 kHz. For CDMA (IS-95 Standard) these figures are 869–894 MHz, 824–849 MHz and 1250 kHz, and for D-AMPS the same bands as for CDMA with a channel spacing of 30 kHz. It can be seen from this figures that the frequency bands of the different systems are different, and, more importantly, that the bandwidth of the desired signals greatly varies. On top of variable bandwidth requirement, optimal filtering for the receiver depends on actual signal conditions. A more stringent band limitation to a desired signal minimum band width is desirable even at the cost of distorting the signal phase and information if the power level at neighbouring channels is high.

Because people are more and more travelling around the world and do want to use their mobile phone everywhere, there is a strong need for multi-band receiving devices. At present some multi-band receiving devices are onto the market. Most of these devices have multi-branch receivers, i.e., the receiver has parallel receiver branches which are optimised for each particular system. Sharing of hardware and software in such multi-band receivers is mostly after frequency conversion and sampling of the radio signals. Such devices are inefficient because there is a low level of hardware and software integration as regards radio functionality for different frequency bands.

SUMMARY OF THE INVENTION

It is an object of the present invention to provide a an efficient and cheap multi-band wireless communication device with a high performance.

To this end the wireless communication device according to the present invention is characterised by the features as defined in the claims. The present invention is based upon the insight that the bandwidth of the signal to be processed is an important parameter for obtaining an optimal receiver. If the bandwidth is wide enough, e.g. in the order of two or three times the information bandwidth of the desired signal, it is realised that the desired signal than passes the selection means with practically zero inter-symbol-interference. It was further realised that alternatively and equivalently the sampling time could be adapted to achieve the same optimal results. The principles of the invention can be applied to both a single band and a multi-band wireless communication device.

In one embodiment, bandwidth estimation is performed. Herewith, fully automatic adaptation in the receiver part itself is obtained. A priori knowledge about the currently received signals and system could also be acquired. Such a priori knowledge could be obtained via a system broadcast channel when the receiver is still in a non-optimal receiving mode. On the basis of such a priori knowledge, the selection means are controlled so as to put the receiver in an optimal reception mode for the current system.

In other embodiments, sampling means are used which are band limiting. Herewith, it is achieved that the sampling means do not add a substantial contribution to the preselected lower frequency band signals. This is achieved by effectively reducing the noise bandwidth of the pre-selected signal with a substantial factor. When switching ten capacitors in parallel, for instance, the noise bandwidth is reduced by a factor of ten. The same noise reduction can be achieved by a kind of averaging using digital processing means. The sampling rates at the input and output of the sampling means can be or are variable.

In a further embodiment, adaptive filtering is performed after sampling. Herewith, the receiver can dynamically adapt itself to varying adjacent channel to interference levels. Such a filter can be a Gaussion filter with an adaptive roll-off factor and/or bandwidth.

The receiver preferably is a direct conversion receiver. Herewith, the complete receiver could be integrated, possibly as a single chip receiver.

BRIEF DESCRIPTION OF THE DRAWINGS

The present invention will now be described, by way of example, with reference to the accompanying drawings, wherein.

Throughout the figures the same reference numerals are used for the same features.

DETAILED DESCRIPTION OF THE INVENTION

Figure 1:
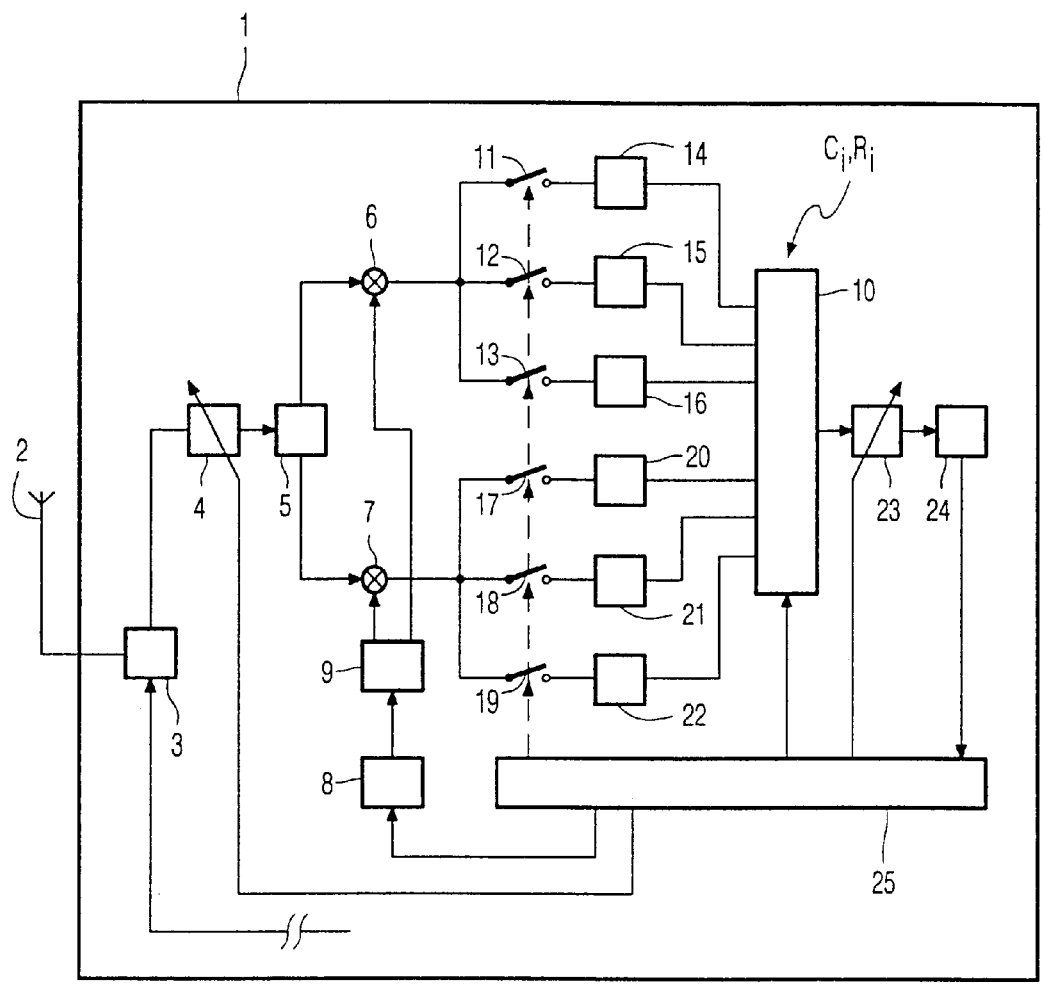
FIG. 1 shows a block diagram of a wireless communication device according to the present invention.

FIG. 1 shows a block diagram of a wireless communication device 1 according to the present invention. The wireless communication device 1, which is suitable and adapted for use in a variety of cellular radio networks such as a GSM network, a CDMA network, a D-AMPS network or any other suitable cellular radio communications network, in principle is a two-way communications device of which the receive branch is shown in detail. The transmit branch, which is not shown in detail here can be any transmit branch suitable for multi-band transmission. Because in the receive branch the type of system is determined, filters in the transmit branch can easily be optimally adjusted in accordance with the knowledge of the bandwidth of the desired signal acquired in the receive branch. Herewith, as in the receive branch, optimal hardware and software sharing can be achieved. The communication device 1 can also be a receive-only device such as a multi-band pager receiver such as a receiver suitable for POCSAG (Post Office Code Standardisation Advisory Group, a UK Standard) and ERMES (European Radio MEssage System, a European Standard), or include an additional receive only device such as a geographical positioning receiver for GPS (Global Positioning System) signals.

The wireless communication device 1 comprises an antenna 2 for receiving radio signals in one or several radio frequency bands of one or several systems. The antenna is coupled to a receive/transmit duplexer 3. In the event of the receiver being a pager such a duplexer is not present. The duplexer is coupled to a receive branch comprising a tuneable filter amplifier chain 4 for coarse band limitation. Once the desired system is determined, the filter amplifier chain 4 is adjusted to such a system. At an output side, the chain 4 is coupled to a power splitter 5 of which respective outputs are fed to quadrature mixer branches with respective mixers 6 and 7. Quadrature local oscillator signals are generated by a controllable synthesiser or a voltage controlled oscillator 8 coupled to a phase shifting network 9 providing in-phase and quadrature local oscillator signals to the respective mixers 6 and 7. Further blocks like amplifiers or automatic gain control circuits which are needed for the functioning of a transceiver and which are known as such are not elucidated in detail in the following description.

At output side, the mixer 6 is coupled to a sampling means 10 via a plurality of series arrangements of controllable switches 11, 12 and 13 with respective distributed resistor-capacitor filter networks 14, 15 and 16. Similarly, the mixer 7 is coupled to the sampling means 10 via switches 17, 18 and 19 and distributed resistor-capacitor filter networks 20, 21 and 22. Such distributed resistor-capacitor networks are known as such and are known to be amplitude linear ideally, as well as to have linear phase and steep frequency roll-off characteristics. From a noise performance point of view, an equivalent resistor value $R_i$ and an equivalent capacitor value $C_i$ can be assigned to the sampling means 10. These resistance and capacitance values then determine the signal band width, noise coupling bandwidth and the level of thermal noise level of the sampling circuitry. At output side, the sampling means 10 is coupled to an adaptive filtering means 23 which is adapted in accordance to the determined channel to interference level in the received and demodulated signal. The filtering means 23 can be a linear low pass filter or a Gaussian filter of which the roll-off factor can be adjusted. For a high level of channel signal to adjacent channel interference, the roll-off of the frequency response is set less steep than for a low level of channel to interference. By adapting the roll-off, the band width, or both, a trade-off is made between channel to interference and inter symbol interference. Output signals of the filter 23 are digitised by analog-to-digital conversion means 24. Digitised values are stored and processed in storage and processing means 25 which can be a microcontroller with a programmed non-volatile memory, volatile random access memory for storing and retrieving data, and input/output control means. Such microcontrollers are well-known as such. The programmed microcontroller 25 controls the switches 11, 12 and 13, and 17, 18 and 19, and all other adjustments as described. The microcontroller 25 is programmed to carry out all described functionality.

The switches 11, 12 and 13, and 17, 18 and 19, together with the microcontroller 25 form selection means according to the present invention for pre-selecting a sampling bandwidth and/or sampling time of the lower frequency band signals, preferably zero-IF signals. The desired sampling bandwidth is selected wide enough to enable the desired signal to pass with zero inter symbol interference. In the example given, an appropriate filter is selected, but also an adaptive filter can be used of which the bandwidth can be switched from one bandwidth to another or varied continually over a wide range although such a solution might encounter practical problems to realise such a filter. In the example given, the filter 14 has a bandwidth of 160 kHz, the filter 15 a bandwidth of 1.6 MHz, and the filter 16 a bandwidth of 16 MHz.

Figure 2:
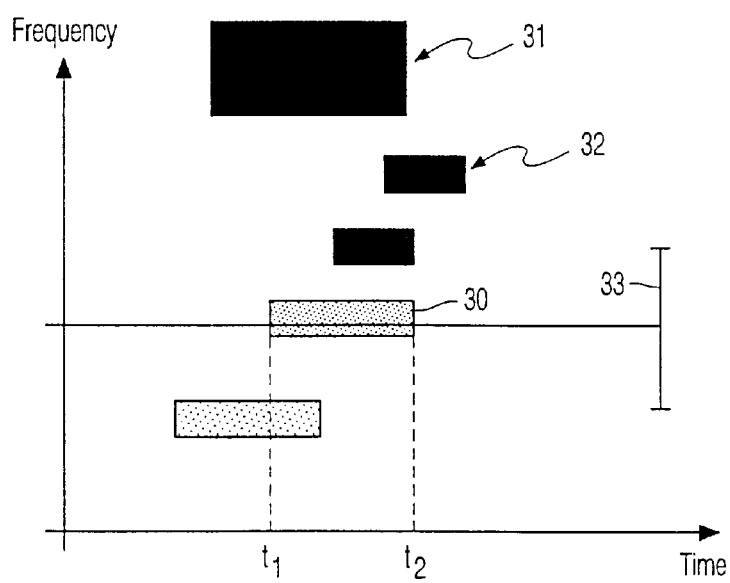
FIG. 2 shows a frequency versus time diagram for illustrating preselection of bandwidth according to the present invention.

FIG. 2 shows a frequency versus time diagram for illustrating preselection of bandwidth according to the present invention. It is assumed that at their outputs both mixers 6 and 7 have desired channel information 30, spectrally centered around zero frequency and time wise extending from $t_1$ to $t_2$. Around this desired information interference signals 31 and 32 are present, scattered both in time and frequency. It will thus be clear that, prior to the operation of the device 1, the bandwidth of the desired signal is not known. Further shown is a selected bandwidth 33 in the order of two or three times the bandwidth of the desired signal.

Figure 3:
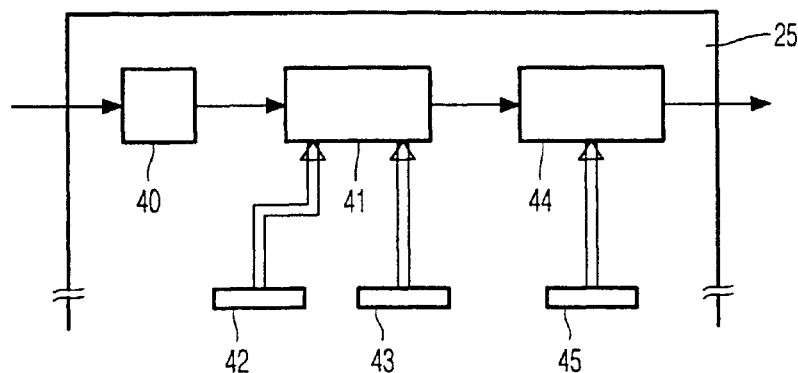
FIG. 3 shows an embodiment of bandwidth estimation of a frequency band of a desired signal.

FIG. 3 shows an embodiment of bandwidth estimation of a frequency band of a desired signal. Digitised samples of the received signal are stored in a storage 40. Upon determination of the bandwidth, the stored digitised samples are fed to a bandpass filter 41 with an adjustable bandwidth and centre frequency. Adjustment values are stored by the processing means 25 in a bandwidth register 42 and a centre frequency register 43. Herewith, a kind of finger-printing can be done for the systems for which the multi-band device 1 was designed. The bandpass register is coupled to an energy detector 44 to which a known energy threshold value is also fed which is stored in an energy threshold register 45. The energy detector 44, e.g. Fast Fourier Transform means, compares noise floor and relative energies of the received signal with finger-prints of a priori known systems. Herewith, the received system can be identified and thus the bandwidth and band. The microcontroller selects an appropriate sampling bandwidth and/or sampling time accordingly. In this respect it should be realised that, given a fixed storage size, the product of sampling time and sampling bandwidth is constant. So, either sampling of a long burst with a narrow bandwidth can be done or of a short burst with a wider bandwidth.

Figure 4:
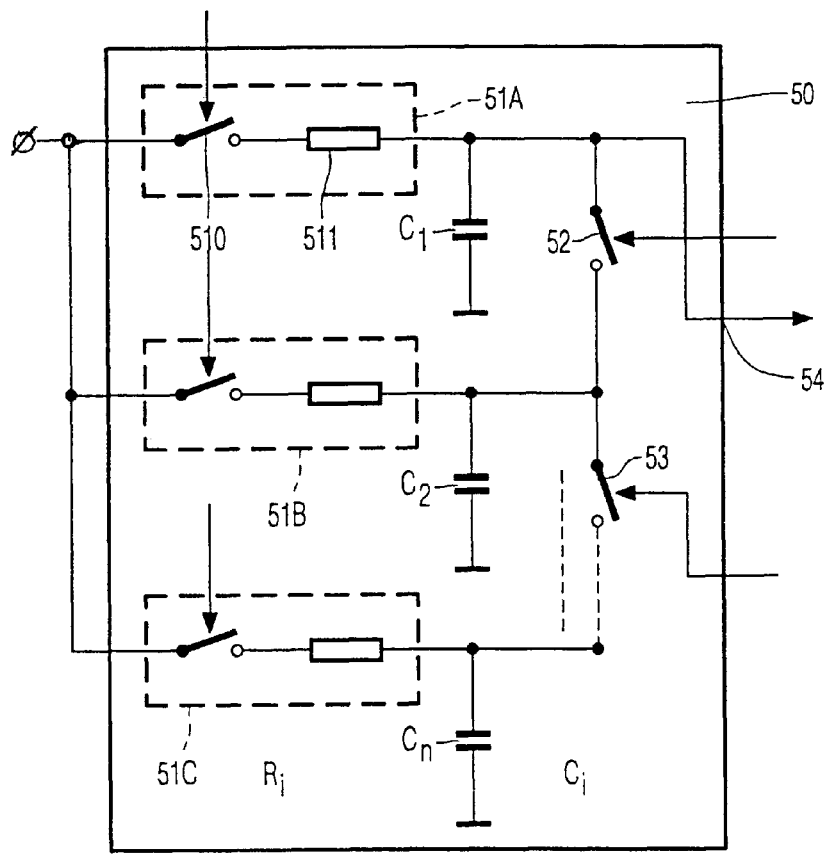
FIG. 4 shows a sampling network according to the present invention.

FIG. 4 shows a sampling network 50 according to the present invention being band limited sampling means. The network 50 comprises sampling switches 51A, 51B and 51C, represented by an ideal switch 510 and the equivalent resistor $R_i$ 511 and a plurality of capacitors $C_1, C_2, \ldots, C_n$, each corresponding to a unit capacitor $C_i$. The processing means 25 controls the sampling network 50 such that the capacitors can be coupled in parallel by actuating the respective switches 52 and 53 etceteras. At an output 54 of the network 50 a sampled signal is available with a desired signal sampling bandwidth and a noise bandwidth not exceeding the signal bandwidth. A noise reduction as regards the input signal with a factor equal to the number of parallel capacitors. Such a noise reduction is needed when receiving a signal having a bandwidth smaller than the bandwidth of an individual switch resistance and a single sampling capacitor $C_i$. Without such measures, a larger noise bandwidth would be sampled and folded multifold onto the signal bandwidth of the desired signal. As an example, if the sampling band width of a switch and one sampling capacitor $C_i$ is $BW_s$ (e.g. 1.6 MHz), the sampling of a signal band width $BW_s/4$ (i.e. 400 kHz) without folding thermal noise multiple times into signal band can be performed by using a single switch 51 and four unit capacitors Ci coupled in parallel. In comparison, the sampling of a 1.6 MHz band would take place taking a sample individually to each capacitor e.g. by using a switch for each capacitor in FIG. 4. The sampling bandwidth can also be changed by changing the series resistance of the switch or by adding another resistance in series with the switch.

The values of the equivalent capacitor $C_i$ and the equivalent resistor $R_i$ should be chosen such that the storage capacitor does not contribute to the overall noise. At the output of the selection means the samples are stored with a storage bandwidth which is the same as the bandwidth of the selected lowpass filter. Then, an equivalent noise voltage is present of $kT/C_i$, k being the constant of Boltzmann, T being absolute temperature and $C_i$ being the equivalent storage capacitance.

Below a table is given for selecting the values of $C_i$ and $R_i$ such that the storage capacitor does not contribute to the overall noise voltage.

| $C_i/R_i$ | 1 k | 10 k | 100 k | 1 M | Ohms |
|---|---|---|---|---|---|
| 0.1 pF | 1600 M | 160 M | 16 M | 1.6 M | |
| 1 pF | 160 M | 16 M | 1.6 M | 0.16 M | |
| 10 pF | 16 M | 1.6 M | 0.16 M | 0.016 M | |
| 40 pF | 4 M | 0.4 M | 0,04 M | 0.004 M | |
| 100 pF | 1.6 M | 0.16 M | 0.016 M | 0.0016 M | |

The values in the above tables represent a sampling bandwidth in MHz. The above table expresses that if the sampling means can handle the entirely selected band properly, the noise spectrum due to sampling has the same noise limit as the Boltzman noise of an ideally matched resistors, i.e., −174 dBm/Hz. In such a case, the spectral noise energy density kT is independent of the value of the storage capacitor $C_i$.

According to the above table, a sampling band width of 1.6 MHz can be implemented with a 10 pF sampling capacitor and 10 kOhm switch resistance. Accordingly, the pre-selected bandwidth of filter 14–16 and 20–22, respectively, should be chosen to be approximately 1.6 MHz. This bandwidth is applicable to e.g. the CDMA cellular system according to IS-95 standard. In order to process the entire band width, the sampling rate should be 3.2 MHz. In the case that the bandwidth of interest would be reduced to 160 kHz, the sampling bandwidth for signal and noise is reduced to this value by coupling ten sampling capacitors in parallel. This effect can be achieved in alternative ways, either by coupling the capacitors in parallel, prior to taking samples, and by sampling at the reduced rate, or by continuing to take samples at 3.2 MHz, and by coupling the capacitors in parallel after sampling or by increasing the switching resistance as described above. The samples would then be read out at a lower rate of 320 kHz.

Figure 5:
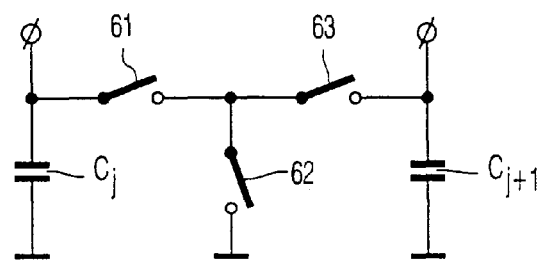
FIG. 5 shows a modified sampling network.

FIG. 5 shows a modified sampling network comprising additional switches so as to avoid cross-talk between two sampling capacitors. Two consecutive of capacitors $C_j$ and $C_{j+1}$ of the sampling network 50 are then coupled via three switches 61, 62 and 63. When the capacitors are isolated from each other, the switches 61 and 63 are open and the switch 62 is closed so that all stray capacitances between $C_j$ and $C_{j-1}$ are connected to ground. Herewith, the crosstalk is reduced to zero. When the capacitors are coupled with each other, the switches 61 and 63 are closed and the switch 52 is open.

Instead of using the capacitor network 50 as described a s regards FIG. 4 for noise bandwidth reduction, such a bandwidth reduction can also be achieved by re-processing the samples. Assume an input of 10 MHz samples and a known signal bandwidth of 1 MHz. Then, it can easily be seen that the sum of N signal samples can be written mathematically as N times the signal sample plus the sum over N noise samples. By re-processing the samples, the effective noise is reduced with a factor of N.

With having the above described highly linear, low noise input sampling it is possible to construct a receiver wherein a large part of channel filtering can be performed after sampling and even after analogue-to digital conversion, if the case may be. An additional advantage is that, provided there are sufficient time intervals between receive and transmit bursts, the intensive signal processing and analog-to-digital conversion can be performed non-simultaneously with analog RF signal reception or transmission, enabling these to take place on the same semiconductor chip with the receiver front-end and transmitter parts.

The sampling rates and bandwidth can be arranged such that bandwidths of e.g. 5 MHz, 2 MHz, 1 MHz, 400 kHz and 200 kHz can be optimally covered by means of hardware which is easily configurable, i.e. is low cost. As an example, a GSM receiver can have a sampling band width of 400 kHz, and the channel filtering down to approx. 130 kHz be adaptive in terms of band width and steepness, according to adjacent channel power conditions. With adding a further pre-filter e.g. of a band width of 40 kHz and coupling further sampling capacitors in parallel, it is feasible to construct a high performance receiver covering band widths of 30 kHz for IS-136, 200 kHz for GSM and 1.25 MHz for IS-95 CDMA. Furthermore, the principle can be deployed for development of new, cost effective radio interfaces.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A wireless communications device comprising:
   a mixer having a quadrature detector that down-converts a received signal to a baseband signal,
   a plurality of selectable filters, operably coupled to the mixer, that are each configured to filter the baseband signal to provide a bandlimited signal, and
   a sampler, operably coupled to the plurality of filters that is configured to sample the bandlimited signal to provide a sampled signal, and
   a controller, operably coupled to the plurality of selectable filters and to the sampler, that is configured to select at least one selected filter of the plurality of filters, based on a measure of an energy content of the sampled signal.

2. A wireless communication device comprising a radio frequency part for receiving radio signals in a radio frequency band, mixing means for mixing down received radio signals to a lower frequency band, sampling means for sampling the mixed-down radio frequency signals, and storage and processing means for storing and processing the sampled lower frequency band signals, characterised in that the communication device is a receiving device arranged to receive radio signals from at least one frequency band, that the communication device comprises selection means for selecting a sampling bandwidth or sampling time of the lower frequency band signals, the selection means being controlled on the basis of a priori known bandwidth of a desired signal or on the basis of an estimated bandwidth of the desired signal such that the sampling is optimised as regards to the bandwidth of the desired signal;
   wherein the sampling means is a band limited sampling means, which is coupled the selection means, so as to limit the bandwidth of noise at an output of the selection means;
   wherein an adaptive filtering means comprising a Gaussian finite impulse response filter with an adjustable roll-off factor or bandwidth is coupled to the sampling means, the communication device being arranged to determine the signal levels within the desired channel and within adjacent channels and to adapt the adaptive filtering means such that the filter has a substantially more bandlimiting character for a high adjacent channel to desired channel interference level than for a low interference level.

3. A wireless communication device comprising a radio frequency part for receiving radio signals in a radio frequency band, mixing means for mixing down received radio signals to a lower frequency band, sampling means for sampling the mixed-down radio frequency signals, and storage and processing means for storing and processing the sampled lower frequency band signals, characterised in that the communication device is a receiving device arranged to receive radio signals from at least one frequency band, that the communication device comprises selection means for selecting a sampling bandwidth or sampling time of the lower frequency band signals, the selection means being controlled on the basis of a priori known bandwidth of a desired signal or on the basis of an estimated bandwidth of the desired signal such that the sampling is optimised as regards to the bandwidth of the desired signal;
   wherein the sampling means is a band limited sampling means, which is coupled the selection means, so as to limit the bandwidth of noise at an output of the selection means;
   wherein the band limited sampling means is a network of preferably a single sampling switch coupled to at least one capacitor, in the event of at least two capacitors the capacitors being switched parallel, successively, and wherein an adaptive filtering means comprising a Gaussian finite impulse response filter with an adjustable roll-off factor or bandwidth is coupled to the sampling means, the communication device being arranged to determine the signal levels within the desired channel and within adjacent channels and to adapt the adaptive filtering means such that the filter has a substantially more bandlimiting character for a high adjacent channel to desired channel interference level than for a low interference level.

4. A wireless communication device comprising a radio frequency part for receiving radio signals in a radio frequency band, mixing means for mixing down received radio signals to a lower frequency band, sampling means for sampling the mixed-down radio frequency signals, and storage and processing means for storing and processing the sampled lower frequency band signals, characterised in that the communication device is a receiving device arranged to receive radio signals from at least one frequency band, that the communication device comprises selection means for selecting a sampling bandwidth or sampling time of the lower frequency band signals, the selection means being controlled on the basis of a priori known bandwidth of a desired signal or on the basis of an estimated bandwidth of the desired signal such that the sampling is optimised as regards to the bandwidth of the desired signal;
   wherein the sampling means is a band limited sampling means, which is coupled the selection means, so as to limit the bandwidth of noise at an output of the selection means;
   wherein the bandlimited sampling means is comprised of the preferably single sampling switch for acquiring samples and the storage and processing means, the processing means being arranged for reprocessing the samples such that the noise at the output of the selection means is reduced substantially, and wherein an adaptive filtering means comprising a Gaussian finite impulse response filter with an adjustable roll-off factor or bandwidth is coupled to the sampling means, the communication device being arranged to determine the signal levels within the desired channel and within adjacent channels and to adapt the adaptive filtering means such that the filter has a substantially more bandlimiting character for a high adjacent channel to desired channel interference level than for a low interference level.

5. A wireless communication device comprising a radio frequency part for receiving radio signals in a radio frequency band, mixing means for mixing down received radio signals to a lower frequency band, sampling means for sampling the mixed-down radio frequency signals, an adaptive filtering means comprising a Gaussian finite impulse response filter with an adjustable roll-off factor or bandwidth is coupled to the sampling means, and storage and processing means for storing and processing the sampled lower frequency band signals, characterised in that the communication device is a receiving device arranged to receive radio signals from at least one frequency band, that the communication device comprises selection means for selecting a sampling bandwidth or sampling time of the lower frequency band signals, the selection means being controlled on the basis of a priori known bandwidth of a desired signal or on the basis of an estimated bandwidth of the desired signal such that the sampling is optimised as regards to the bandwidth of the desired signal.

* * * * *